US012223067B2

United States Patent
Wolf et al.

(10) Patent No.: US 12,223,067 B2
(45) Date of Patent: *Feb. 11, 2025

(54) SECURE DATA COLLECTION FROM AN AIR-GAPPED NETWORK

(71) Applicant: ServiceNow, Inc., Santa Clara, CA (US)

(72) Inventors: Cody Wolf, Zug (CH); Sreenevas Subramaniam, Dublin, CA (US); Séverin Launiau, Cary, NC (US); Luke Andrew Kasper, Lansdale, PA (US); Evan Orgel, Edison, NJ (US); Ryan Craig Zulli, Rockaway, NJ (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,245

(22) Filed: Mar. 8, 2024

(65) Prior Publication Data

US 2024/0256683 A1  Aug. 1, 2024

Related U.S. Application Data

(63) Continuation of application No. 17/230,767, filed on Apr. 14, 2021, now Pat. No. 11,954,211.

(51) Int. Cl.
*G06F 21/60* (2013.01)
*G06F 9/445* (2018.01)
(Continued)

(52) U.S. Cl.
CPC ........ *G06F 21/604* (2013.01); *G06F 9/44505* (2013.01); *G06F 21/105* (2013.01);
(Continued)

(58) Field of Classification Search
CPC .. G06F 21/604; G06F 9/44505; G06F 21/105; G06F 21/6218; G06F 21/107;
(Continued)

(56) References Cited

U.S. PATENT DOCUMENTS

| | | | |
|---|---|---|---|
| 11,032,131 B1* | 6/2021 | Franceschetti | ........ G06F 21/606 |
| 2005/0125589 A1* | 6/2005 | Feng | ........ G06F 13/32 |
| | | | 710/313 |

(Continued)

FOREIGN PATENT DOCUMENTS

WO  2021148461  7/2021

OTHER PUBLICATIONS

Author Unknown, "Agent-Based Offline Discovery", downloaded from <https://docs.device42.com/auto-discovery/agent-based-offline-discovery/> on Jan. 29, 2021.

*Primary Examiner* — Joseph P Hirl
*Assistant Examiner* — Aayush Aryal
(74) *Attorney, Agent, or Firm* — McDonnell Boehnen Hulbert & Berghoff LLP (57) ABSTRACT

Configuration item data from information technology resources of an air-gapped network are collected for an information technology configuration management database. The collected configuration item data is filtered using a specified item data property including by automatically identifying a collected information of interest about a discovered information technology asset among the collected configuration item data and irreversibly modifying the collected information of interest about the discovered information technology asset included in the collected configuration item data. Based on a type of content that has been modified in the collected information of interest, a new automatic rule indicating the type of content to be avoided during a future data collection is determined. At least a portion of the (Continued)

filtered collected configuration item data is stored on a portable physical storage medium within the air-gapped network.

20 Claims, 5 Drawing Sheets

(51) Int. Cl.
    *G06F 21/10*         (2013.01)
    *G06F 21/62*         (2013.01)

(52) U.S. Cl.
    CPC ........ *G06F 21/6218* (2013.01); *G06F 21/107* (2023.08); *G06F 2221/2141* (2013.01)

(58) Field of Classification Search
    CPC ..... G06F 2221/2141; G06F 2221/2105; G06F 21/606
    See application file for complete search history.

(56) References Cited

U.S. PATENT DOCUMENTS

| | | | |
|---|---|---|---|
| 2016/0134595 A1 | 5/2016 | Lavinio | |
| 2016/0241583 A1* | 8/2016 | Kowalczyk | H04L 63/20 |
| 2019/0166029 A1* | 5/2019 | Abrams | H04L 63/083 |
| 2019/0297078 A1* | 9/2019 | Davis, III | H04L 63/0876 |
| 2020/0092178 A1* | 3/2020 | Nelson | G06Q 10/06316 |
| 2022/0012134 A1* | 1/2022 | Chatterjee | G06F 11/1456 |
| 2022/0156395 A1* | 5/2022 | Bednash | G06F 9/5011 |
| 2022/0286804 A1* | 9/2022 | Danducci, II | G06Q 30/0282 |

\* cited by examiner

SECURE DATA COLLECTION FROM AN AIR-GAPPED NETWORK

CROSS REFERENCE TO OTHER APPLICATIONS

This application is a continuation of U.S. patent application Ser. No. 17/230,767 entitled SECURE DATA COLLECTION FROM AN AIR-GAPPED NETWORK filed Apr. 14, 2021 which is incorporated herein by reference for all purposes.

BACKGROUND OF THE INVENTION

A computer network is a group of computers and/or other electronic devices that use a set of common communication protocols over digital interconnections for the purpose of sharing resources located on or provided by network nodes. The nodes of a computer network may include personal computers, servers, networking hardware, or other specialized or general-purpose hosts. The nodes may be identified by hostnames and network addresses. Hostnames serve as memorable labels for the nodes and network addresses serve for locating and identifying the nodes by communication protocols. An air-gapped network (also referred to as a disconnected network) is a computer network that is physically isolated from other computer networks in that the air-gapped network has no network interfaces connected to other networks. While air-gapped networks have advantages with respect to security, they are also more difficult to access for routine analysis, maintenance, and other functions. Transferring data out (also referred to as exfiltrating data) of an air-gapped network can be challenging due to the lack of network interfaces. Thus, techniques directed toward securely and efficiently collecting data from air-gapped networks would be beneficial.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data collection from an air-gapped network is disclosed. A computer program component configured to collect configuration item data from information technology resources of an air-gapped network for an information technology configuration management database (CMDB) is provided. Configuration item data collected from the information technology resources of the air-gapped network is obtained using the provided computer program component, wherein the obtained configuration item data is physically transferred between a device within the air-gapped network and a device outside the air-gapped network at least in part via a portable physical storage medium, and the collected configuration item data has been reviewed and filtered within the air-gapped network prior to being physically transferred via the portable physical storage medium. The obtained configuration item data is imported to the information technology CMDB outside the air-gapped network. Information technology management services are provided for the air-gapped network using the imported configuration item data stored outside the air-gapped network. A practical and technological advantage of the techniques disclosed herein is the ability to utilize automated configuration item (CI) discovery components for monitoring information technology (IT) resources of an air-gapped network. The techniques disclosed herein solve the problem of automated IT monitoring of air-gapped networks. This problem of monitoring air-gapped networks has been unsolved because completely automated approaches cannot account for the lack of network connections within air-gapped networks to outside computer networks. Techniques to solve this problem are described in detail herein.

Figure 1:
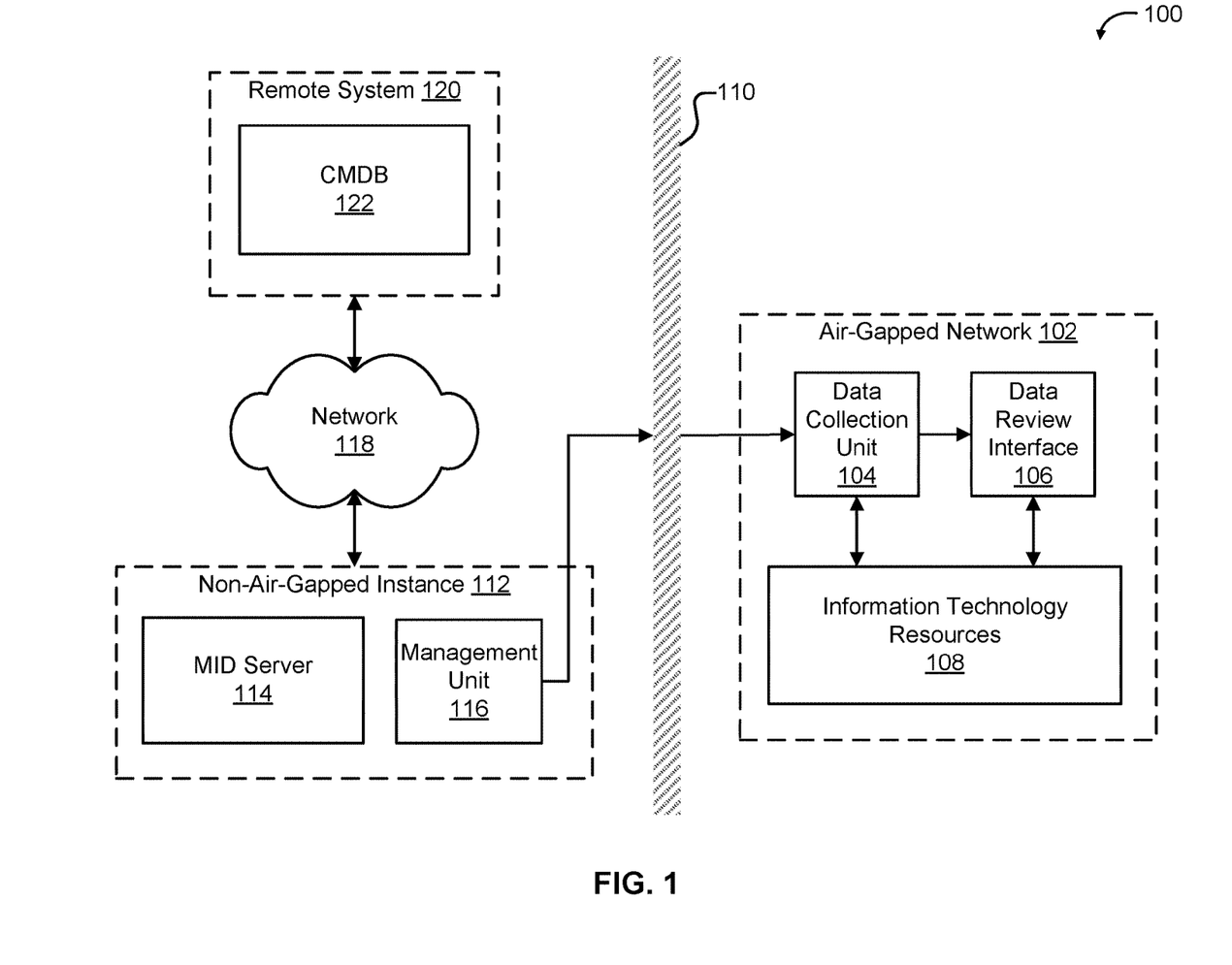
FIG. 1 is a block diagram illustrating an embodiment of a system for collecting data from an air-gapped network.

FIG. 1 is a block diagram illustrating an embodiment of a system for collecting data from an air-gapped network. In the example illustrated, system 100 includes air-gapped network 102, network barrier 110, non-air-gapped instance 112, network 118, and remote system 120. Air-gapped network 102 includes data collection unit 104, data review interface 106, and information technology resources 108. Non-air-gapped instance 112 includes MID server 114 and management unit 116. Remote system 120 includes CMDB 122.

In the example illustrated, network barrier 110 separates air-gapped network 102 from other computer networks. In some embodiments, network barrier 110 includes a physical separation of air-gapped network 102 from other computer networks. For example, network barrier 110 may include a physical wall or other physical barrier that prevents any device within air-gapped network 102 from being physically and electrically coupled (e.g., via a wire or any other conducting medium) with any device outside of air-gapped network 102. A physical barrier to air-gapped network 102 oftentimes includes a physical access point for authorized personnel (e.g., a door with a lock). Stated alternatively, network barrier 110 eliminates wired communication interfaces out of air-gapped network 102. Network barrier 110 also represents a lack of wireless communication out of air-gapped network 102. This may be accomplished by removing or deactivating wireless routers and other wireless networking components from air-gapped network 102. In some embodiments, network barrier 110 includes a physical barrier (e.g., a Faraday cage) that blocks electronic wireless communication with air-gapped network 102. Network barrier 110 conceptually represents a communicative closing off of air-gapped network 102 from other computer networks. Techniques for this closing off are not limited to those described herein. Various techniques for preventing electronic communication between air-gapped network 102 and outside networks are possible. Due to network barrier 110, outside devices and networks, including non-air-gapped instance 112 and remote system 120 are not communicatively coupled with air-gapped network 102 and cannot send to or receive information from air-gapped network 102 via automated electronic means. This also means that users that are communicatively connected to non-air-gapped instance 112 or remote system 120 (e.g., via another network, such as the Internet) are not able to access air-gapped network 102.

In various embodiments, data collection unit 104 collects configuration item data from information technology resources 108. Information technology resources 108 include computer and/or other hardware components along with associated software applications loaded onto the computer and/or other hardware components within air-gapped network 102. Information technology resources 108 can also include internal (within air-gapped network 102) communications/networks and storage hardware and software components. Information technology resources 108 can include a collection of components distributed across a plurality of servers. Information technology resources 108 is a collection of assets comprising an information technology environment within air-gapped network 102 on which it is desired to perform monitoring and IT management by utilizing CMDB 122 of remote system 120.

Monitoring and managing information technology resources 108 includes collecting CI data associated with information technology resources 108. CI data refers to information about hardware and software assets (the CIs). A CI is a service component, infrastructure element, or other item that needs to be managed to ensure delivery of services. Examples of CI types include: hardware/devices, software/applications, communication/network components, and storage components. Examples of CI data include the following with respect to hardware and/or software assets: name, manufacturer, model identifier, model number, serial number, operating system domain, operating system, operating system version, operating system service pack, other operating system properties, random-access memory (RAM) size and other properties, central processing unit (CPU) manufacturer, speed, cores, and other properties, Internet Protocol (IP) address, other network addresses, software name, usage properties, manufacturer/publisher, version, license type/status, license cost, license duration/expiration date, and other properties, and various other information technology asset properties. CI data can identify software executing on specific hardware devices. Data collection unit 104 comprises computer program components configured to collect CI data from information technology resources 108. In some embodiments, data collection unit 104 comprises computer scripts configured to collect CI data. A computer script refers to a list of commands that are executed by a specified computer program or scripting engine, wherein the computer script is utilized to automate processes on a local computer. Data collection unit 104 can also include a software agent configured to collect CI data. The scripts and/or software agent can be executed on a host (e.g., a computer or other IT end point), collect information on the host and its software processes, create CIs for the host, create CIs for software processes/applications running on the host, update CIs dynamically (monitor CIs over a period of time), generate files with CI information, and prepare the generated files for review and exfiltration out of air-gapped network 102. Stated alternatively, data collection unit 104 (e.g., by utilizing scripts or a software agent) performs an inventory of CIs in air-gapped network 102.

In various embodiments, data collection unit 104 outputs computer files cataloguing CI data in a specified format. For example, the CI data may be in a JavaScript Object Notation (JSON) format. The JSON format can be a concatenated format of a list of CI attributes. It is also possible to use various other formats, such as Extensible Markup Language (XML) or any other textual data format. In various embodiments, the outputted computer files are consolidated (e.g., using a consolidation script or other software component of data collection unit 104) into a single computer file for review. In some embodiments, computer program components (e.g., computer scripts, binary files for computer programs/scripting engines to run the scripts, other software components, etc.) are designed by a same designer as remote system 120 to ensure compatibility of the outputs of data collection unit 104 with CMDB 122, which ultimately receives and manages the collected CI data. CI data is collected in a manner prescribed by an operator of air-gapped network 102 (e.g., CI data collection scripts can be executed upon launch of IT assets, automatically according to a schedule, manually, and so forth).

In various embodiments, CI data is reviewed via data review interface 106 before the CI data is exfiltrated (transferred out) from air-gapped network 102. In various embodiments, a consolidated file (also referred to as a payload) of CI data to be exfiltrated and ultimately stored in CMDB 122 is received by data review interface 106. In some embodiments, data review interface 106 comprises a graphical user interface (GUI), such as one similar to those used for web applications (a web user interface). In various embodiments, the GUI presents the CI data payload for a security officer of air-gapped network 102 to review. For example, the GUI may list CI data organized according to a logical structure (e.g., according to each hardware asset within air-gapped network 102). CI data is reviewed to meet security requirements. In various embodiments, the security officer uses data review interface 106 to censor (e.g., remove or obfuscate) data that the security officer determines should not leave air-gapped network 102. Removing data involves removing the data from any files that may be transferred out of air-gapped network 102 (but the data would still be accessible from within air-gapped network 102). Obfuscating data involves rendering the data unintelligible. For example, obfuscation can include altering alphanumeric characters of words associated with CIs. The alterations can be random and thus irreversible. They can also be non-random and irreversible (a specified word would be obfuscated in the same way every time but would not be able to be decoded) or non-random and reversible (decoding would be possible). In scenarios in which decoding is possible, obfuscation is functionally similar to encryption.

Examples of data that may be censored (e.g., removed from exported files or obfuscated) include data associated with data mining software, location (e.g., physical location) information, and certain names (e.g., device hostnames). In some embodiments, data review interface 106 provides recommendations to obfuscate rather than remove certain CI information (e.g., names of computers because alphanumeric labels of some form for computers may be required by CMDB 122). In some embodiments, a JSON file with consolidated CI data is reviewed by a security officer by scrolling through the CI data, clicking on items to censor, and approving a reviewed JSON file for export. The security officer is also able to utilize data review interface 106 to perform keyword searches to find specific items to censor.

In various embodiments, data review interface 106 comprises software that automatically filters CI data. For example, users of data review interface 106 are able to configure filters (e.g., according to specified keywords and/or properties) that automatically highlight CI data items (e.g., that match the specified keywords and/or properties, such as a hostname including a specific word) for heightened review (e.g., with recommendations to remove or obfuscate during a manual review). It is also possible for the filters to automatically censor specified data items without manual verification. Examples of data items that may be highlighted or automatically censored include IP addresses, location information, and hostnames. Automatically censoring CI data can include data collection unit 104 not collecting the CI data from information technology resources 108. Avoiding collection of data means there would be no need to filter out that data. In some embodiments, users of data review interface 106 are prompted as to whether data review interface 106 should convert to automatic rules (e.g., save as settings) censorship decisions that are manually made so that subsequently the same censorship decisions are made automatically. Thus, filter configurations of data review interface 106 can be updated and existing censorship rules can be enforced. Multiple checks by multiple security officers are also possible (e.g., by allowing multiple security officers to use data review interface 106, either serially or in parallel). It is also possible for filters to be pre-configured. For example, CI data collection scripts utilized by data collection unit 104 can be provided with pre-configured filters from management unit 116. This is possible, for example, when users of air-gapped network 102 provide input to non-air-gapped instance 112 and/or remote system 120 regarding censorship preferences.

In various embodiments, a reviewed CI data payload (e.g., reviewed by a security officer using data review interface 106), is transferred to a portable physical storage medium. Examples of portable physical storage media include Universal Serial Bus (USB) drives/flash drives, Digital Video Discs (DVDs), compact discs (CDs), external hard drives, and any other portable digital storage media. In various embodiments, the reviewed CI data payload is physically transported out of air-gapped network 102 on the portable physical storage medium (see FIG. 2 for a diagram illustrating transport of the data on the physical storage medium). In many scenarios, the CI data payload on the portable physical storage medium is not encrypted. In many scenarios, the CI data payload is quickly transferred to a computer in the same facility (e.g., building or campus) as air-gapped network 102 (but on the other side of network barrier 110). In such scenarios, because the portable physical storage medium does not leave the same facility as air-gapped network 102, the urgency of encryption is diminished. Not encrypting facilitates transfer of the CI data payload to a non-air-gapped instance in the same facility. It is also possible to encrypt the CI data payload and then decrypt it upon transfer to the non-air-gapped instance.

In various embodiments, a CI data payload is transferred using a portable physical storage medium (e.g., physically carried by a security officer) to non-air-gapped instance 112. In various embodiments, non-air-gapped instance 112 includes one or more computers and/or other hardware and associated software located in a same facility as air-gapped network 102. Non-air-gapped instance 112 includes one or more network interfaces. In some embodiments, the CI data payload is uploaded to MID server 114.

In various embodiments, a management, instrumentation, and discovery (MID) server (e.g., MID server 1114) is a Java application that runs as a Windows service or UNIX daemon on a server in a user's local computer network. In various embodiments, the MID server facilitates communication and movement of data between the user's local computer network and a remote system (e.g., remote system 120). IT operation management can utilize the MID server to obtain data or perform operations in the user's local computer network. The MID server acts as an access/entry point to the user's local computer network with which the remote system (e.g., a remote IT operation management system) can interface. For example, operations can be performed in the MID server by coding "JavaScript script includes" (computer program content to be executed by the MID server) that are deployed to the MID server. Upon receiving requests from specified software agents, in specified forms and/or patterns, or through specified interfaces, such as a cloud application programming interface (CAPI), the MID server can execute script includes to perform operations and return results.

In some embodiments, MID server 114 includes a software portion (e.g., a Java application that runs as a Windows service or UNIX daemon) as well as a hardware portion (e.g., a physical server, such as a computer or other hardware component) that runs the software portion. In some embodiments, MID server 114 is a virtual machine running on a physical machine within non-air-gapped instance 112, which can be a local non-air-gapped computer network counterpart of air-gapped network 102. The examples described herein are merely illustrative; MID server 114 may include various other components and be implemented in various manners. MID server 114 can be used by remote system 120 to obtain data and perform operations in non-air-gapped instance 112. Stated alternatively, MID server 114 can act as an access point and interface for remote system 120 to connect to the various computer systems in non-air-gapped instance 112. In various embodiments, a CI data payload is loaded into a specified directory on MID server 114 via a portable physical storage medium and then the CI data payload is posted to non-air-gapped instance 112 as if the CI data items of the CI data payload were discovered in a fully automated manner. It is also possible to perform another security review of the CI data payload before posting to non-air-gapped instance 112 (e.g., using a GUI similar to or the same as that used within air-gapped network 102 but installed in non-air-gapped instance 112). During normal operation, MID server 114 is able to perform CI discovery automatically. The techniques described herein are utilized to perform at least a portion of CI discovery manually (physically transferring the CI data payload to MID server 114 via the portable physical storage medium). Once uploaded to MID server 114, CI data items can be managed in an automated manner. The techniques herein solve the problem of exfiltrating data from an air-gapped network when fully automated CI discovery that may include end-to-end encryption is not compatible with review and filtering of potentially sensitive data before exfiltration.

In the example illustrated, non-air-gapped instance 112 is communicatively connected to remote system 120 via network 118. Examples of network 118 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, CI data is imported from MID server 114 of non-air-gapped instance 112 to CMDB 122 of remote system 120. In various embodiments, remote system 120 includes computer hardware and software components configured to perform IT operation management. In various embodiments, CMDB 122 provides IT management services for air-gapped network 102 using the imported CI data. In various embodiments, CMDB 122 is a structured set of data held in one or more computers and/or storage devices. Examples of storage devices include hard disk drives and solid-state drives. CMDB 122 stores information about IT environments. In various embodiments, CMDB 122 stores lists of CIs and relationships among CIs. CMDB 122 allows for centralized management of data associated with a diverse set of IT components (e.g., devices) even if the IT components are widely distributed. CMDB 122 can assist with performing IT service management processes, e.g., software asset management (SAM), incident management, change management, problem management, etc. For example, in some embodiments, CMDB 122 is utilized to manage software licenses installed on devices of air-gapped network 102. Managing software licenses can include determining usage of software, analyzing cost of software licenses, determining number of licenses per device, and determining whether the number of licenses on each device is appropriate (e.g., not more than is needed or purchased).

In some embodiments, remote system 120 provides computer program components to management unit 116 via network 118. In various embodiments, the provided computer program components are configured to collect CI data from information technology resources 108 of air-gapped network 102 for CMDB 122. Stated alternatively, in some embodiments, remote system 120 provides computer program components (e.g., computer scripts and/or software) to be provided to data collection unit 104 of air-gapped network 102 to use to collect CI data. The computer program components can be manually delivered (e.g., transferred using a portable physical storage medium) and installed within air-gapped network 102. In various embodiments, management unit 116 stores computer program components to be delivered to data collection unit 104. In some embodiments, a user directs management unit 116 to modify scripts and/or other software to avoid collection of specified CI data. The scripts and/or other software may also be preconfigured to avoid collection of the specified CI data when provided by remote system 120.

Remote system 120 can include various components not shown in FIG. 1. For example, remote system 120 oftentimes includes an identification and reconciliation engine (IRE) that accompanies CMDB 122. An IRE is a software component that acts as a gatekeeper for CMDB data tables, particularly when multiple discovery sources overlap each other with respect to CIs and CI attributes. CI attributes may be reported multiple times and contradict one another. The IRE determines which reported CI attribute to store in CMDB 122 according to a reconciliation rule. In some embodiments, authorization to overwrite (the reconciliation rule) is based on priority of the discovery source (e.g., each discovery source may be assigned a priority score). The reconciliation rule may be that the IRE allows values reported by discovery sources with higher priority to overwrite values reported by discovery sources with lower priority. In some embodiments, CMDB 122 is updated in real-time by the IRE as CI records are being processed.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. The number of components and the connections shown in FIG. 1 are merely illustrative. Components not shown in FIG. 1 may also exist.

Figure 2:
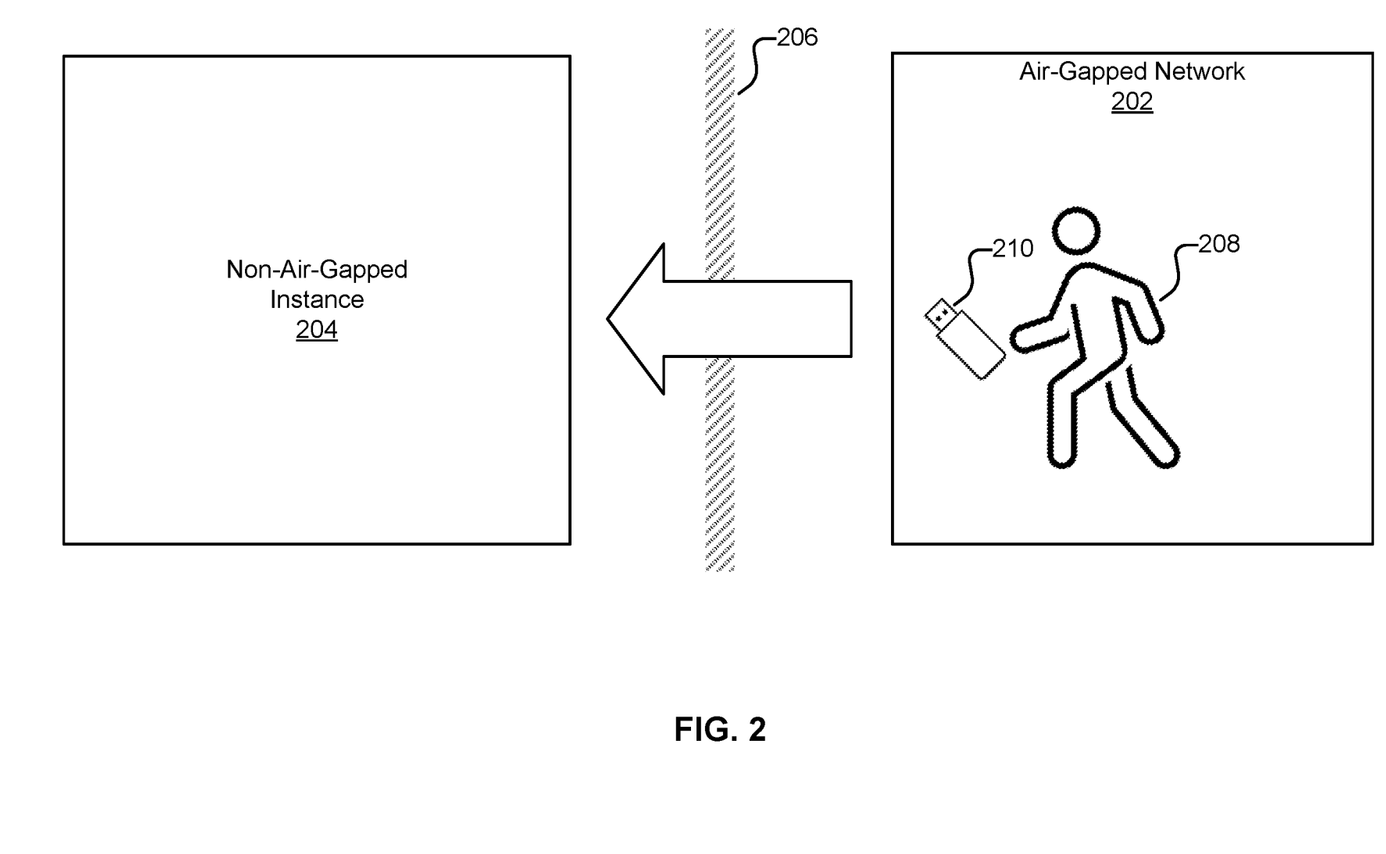
FIG. 2 is a diagram illustrating an example of transporting data out of an air-gapped.

FIG. 2 is a diagram illustrating an example of transporting data out of an air-gapped. In the example shown, human 208 utilizes portable physical storage medium 210 to transport data stored on portable physical storage medium 210 out of air-gapped network 202. The data is carried across network barrier 206 and delivered to non-air-gapped instance 204. Examples of portable physical storage medium 210 include USB drives/flash drives, DVDs, CDs, external hard drives, and other portable digital storage media. In some embodiments, air-gapped network 202 is air-gapped network 102 of FIG. 1. In some embodiments, non-air-gapped instance 204 is non-air-gapped instance 112 of FIG. 1. In some embodiments, network barrier 206 is network barrier 110 of FIG. 1.

Figure 3:
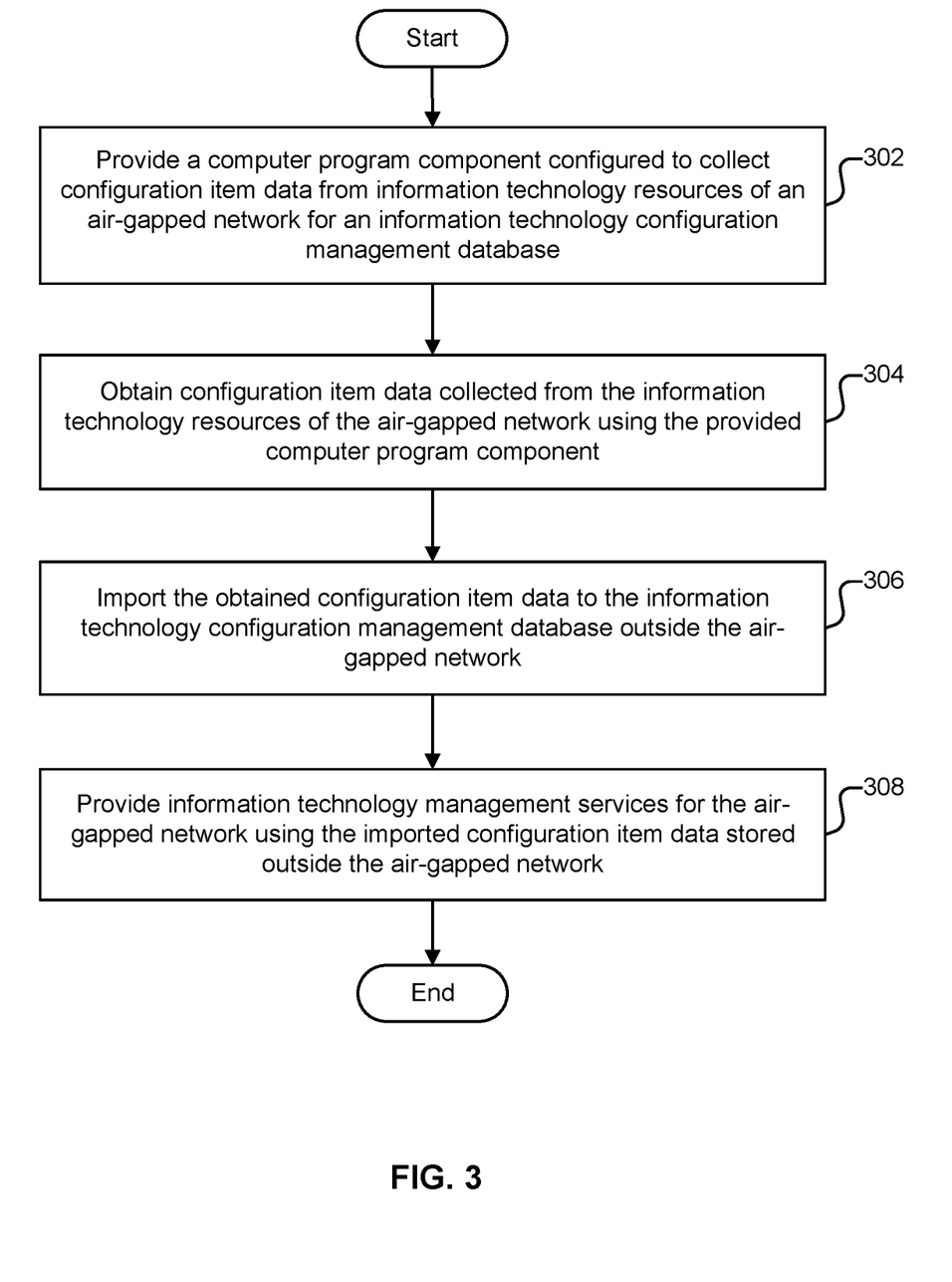
FIG. 3 is a flow diagram illustrating an embodiment of a process for collecting data from an air-gapped network.

FIG. 3 is a flow diagram illustrating an embodiment of a process for collecting data from an air-gapped network. In some embodiments, the process of FIG. 3 is performed by system 100 of FIG. 1.

At 302, a computer program component configured to collect configuration item data from information technology resources of an air-gapped network for an information technology configuration management database is provided. In some embodiments, the computer program component includes one or more computer scripts. The computer program component may also include other computer software. In some embodiments, the configuration item data is collected from information technology resources 108 of air-gapped network 102 of FIG. 1. In some embodiments, the configuration management database is CMDB 122 of FIG. 1.

At 304, configuration item data from the information technology resources of the air-gapped network is obtained using the provided computer program component. In various embodiments, the obtained configuration item data is physically transferred between a device within the air-gapped network and a device outside the air-gapped network at least in part via a portable physical storage medium. An example of physical transfer is copying the configuration item data from a computer within the air-gapped network onto the portable physical storage medium and carrying the portable physical storage medium by hand out of the air-gapped network to upload to a computer outside the air-gapped network. In some embodiments, the portable physical storage medium is portable physical storage medium 210 of FIG. 2. The portable physical storage medium may be carried out of the air-gapped network by a human security officer. In various embodiments, the human security officer or another person has reviewed and/or filtered/censored the obtained configuration item data collected from the information technology resources before transferring the configuration item data onto the portable physical storage medium and out of the air-gapped network. In some embodiments, review and filtering of the collected configuration item data is performed using data review interface 106 of FIG. 1.

At 306, the obtained configuration item data is imported to the information technology configuration management database outside the air-gapped network. In some embodiments, the configuration management database is remote from the air-gapped network (e.g., at a physical location remote from a facility housing the air-gapped network). For example, the configuration management database may be located at remote system 120 of FIG. 1. In some embodiments, an intermediate step of importing the obtained configuration item data to the information technology configuration management database outside the air-gapped network is first uploading the obtained configuration item data to a hardware and/or software component communicatively connected to the configuration management database but located in a facility that also houses the air-gapped network. In some embodiments, the hardware and/or software component is a MID server (e.g., MID server 114 of FIG. 1). In some embodiments, the MID server is a part of a computer network that is communicatively connected to the configuration management database via the Internet. Such a network is separated from the air-gapped network by a network barrier (e.g., network barrier 110 of FIG. 1) but typically located in the same facility (e.g., building or campus) that houses the air-gapped network so that data can be quickly transported via a portable physical storage medium across the network barrier from the air-gapped network to the MID server.

At 308, information technology management services are provided for the air-gapped network using the imported configuration item data stored outside the air-gapped network. In some embodiments, SAM services are provided. For example, the imported configuration item data may be utilized to determine, with respect to hardware of the air-gapped network, what software is licensed/owned, what software is being utilized, how software is being utilized and at what rates, when software licenses will expire, and various other aspects of software asset management.

Figure 4:
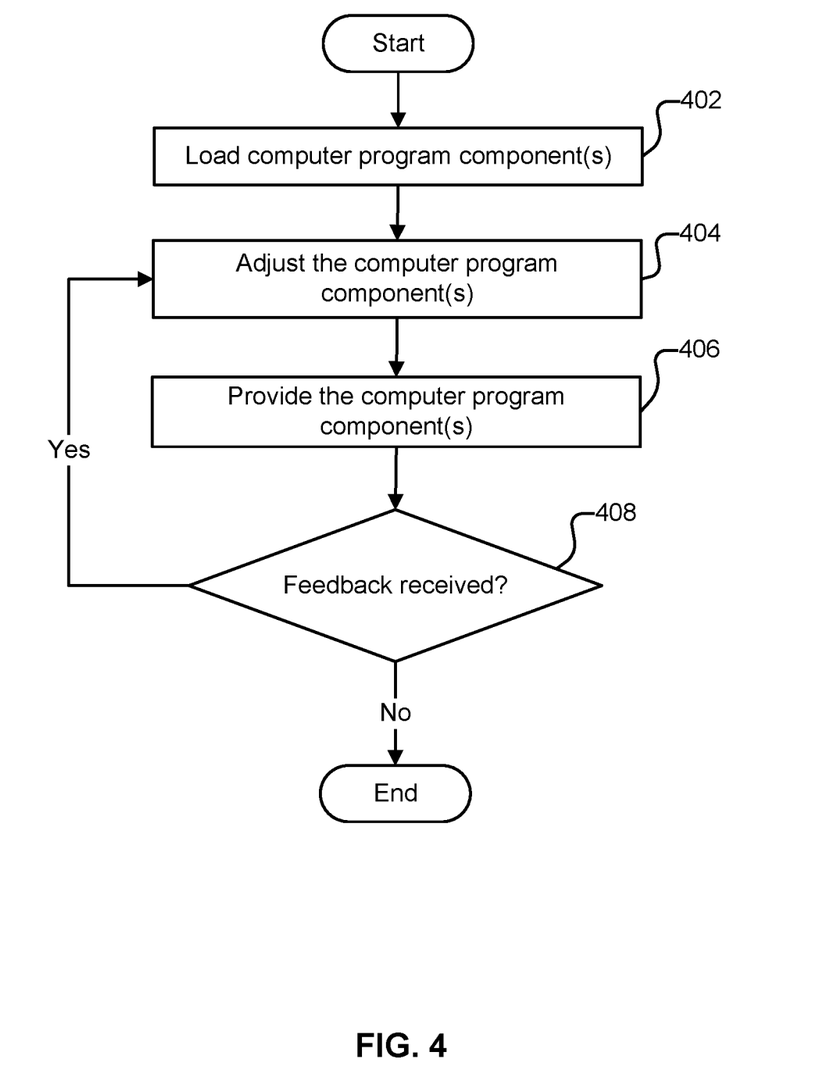
FIG. 4 is a flow diagram illustrating an embodiment of a process for providing computer program component(s) for collecting data to an air-gapped network.

FIG. 4 is a flow diagram illustrating an embodiment of a process for providing computer program component(s) for collecting data to an air-gapped network. In some embodiments, the process of FIG. 4 is performed at least in part by non-air-gapped instance 112 of FIG. 1. In some embodiments, at least a portion of the process of FIG. 4 is performed in 302 of FIG. 3.

At 402, computer program component(s) are loaded. In some embodiments, the computer program component(s) include one or more computer scripts configured to collect CI data from IT resources. In some embodiments, the computer program component(s) are loaded to management unit 116 of non-air-gapped instance 112 of FIG. 1 from remote system 120 of FIG. 1. It is also possible for the computer program component(s) to be loaded manually, e.g., installed via a portable physical storage medium, such as a DVD.

At 404, the computer program component(s) are adjusted. Configuration settings of the computer program component(s) may be adjusted. For example, in some embodiments, the computer program component(s) comprise scripts that include filters to remove or avoid collection of data items that are not desirable to collect. Such items can include specific data attributes (e.g., IP addresses, locations, hostnames, or other identifiers) and/or specific items (e.g., specific software, specific hardware, etc.). Stated alternatively, the filters can include lists of censored software and/or hardware data points. In various embodiments, filter settings are adjusted based on feedback from users of the computer program component(s).

At 406, the computer program component(s) are provided. In some embodiments, the computer program component(s) are provided to data collection unit 104 of air-gapped network 102 of FIG. 1. In some embodiments, the computer program component(s) are provided manually, e.g., installed via a portable physical storage medium, such as a DVD. It may also be possible for the computer program component(s) to be provided automatically via a one-way ingress point to the air-gapped network if such one-way data transfer is allowed and configured. Automated data transfer out of the air-gapped network is not allowed.

At 408, it is determined whether feedback is received. If at 408 it is determined that feedback is not received, then no further action is taken. If at 408 it is determined that feedback is received, at 404, the computer program component(s) are adjusted. In various embodiments, feedback includes user-inputted feedback regarding CI data filter settings. For example, a security officer may review CI data collected using a user interface (e.g., data review interface 106 of FIG. 1) and make data censorship decisions regarding reviewed CI data items. The censorship decisions can be fed back and utilized to update the computer program component(s) (e.g., update CI data collection scripts). Adjustments can be made to the computer program component(s) stored outside of the air-gapped network (e.g., adjustments at non-air-gapped instance 112 of FIG. 1) so that the computer program component(s) reflect the censorship decisions made if the computer program component(s) are provided again to the air-gapped network. Data collection within the air-gapped network can also be altered based on the adjustments by altering how the computer program component(s) execute within the air-gapped network (e.g., see FIG. 5).

Figure 5:
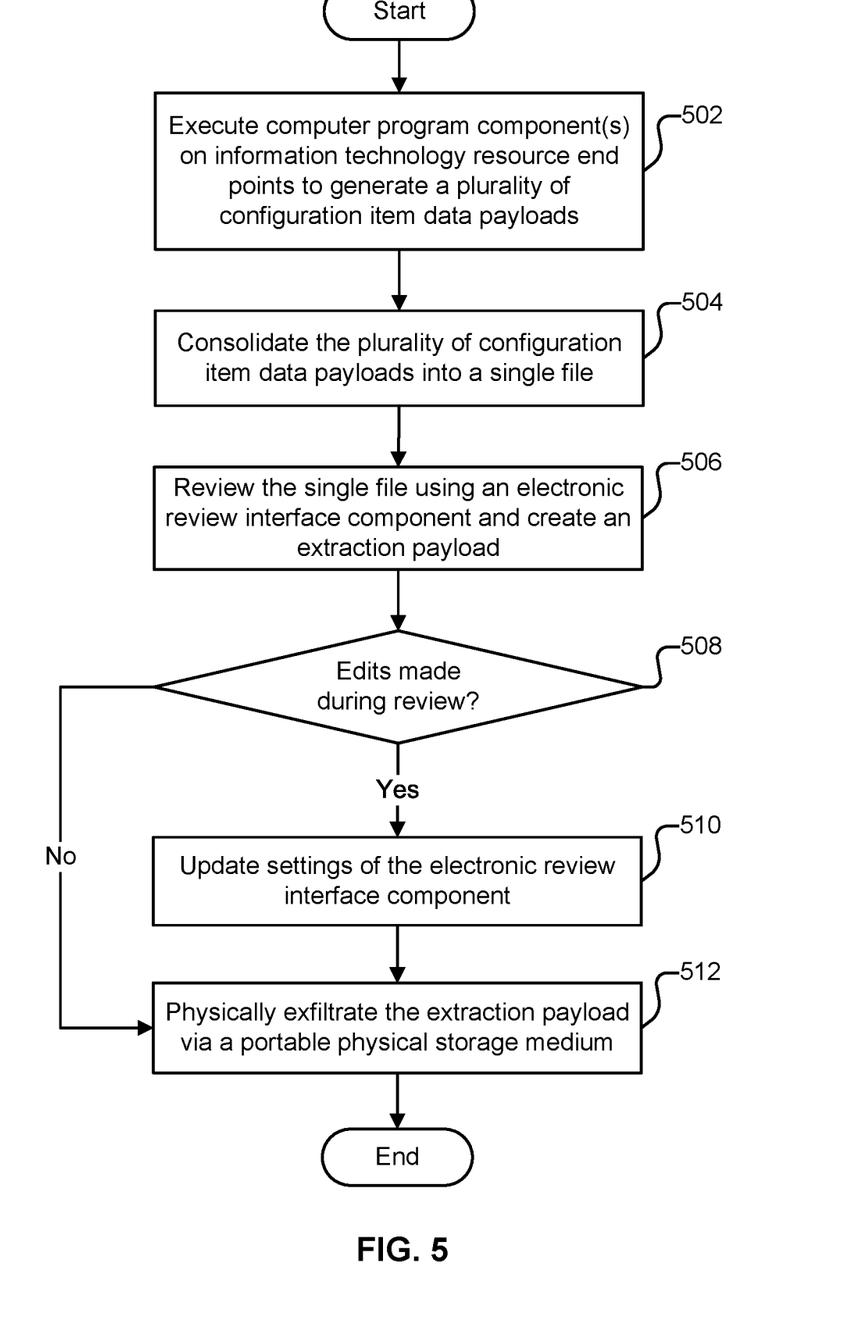
FIG. 5 is a flow diagram illustrating an embodiment of a process for utilizing computer program component(s) to collect data from an air-gapped network.

FIG. 5 is a flow diagram illustrating an embodiment of a process for utilizing computer program component(s) to collect data from an air-gapped network. In some embodiments, the process of FIG. 5 is performed by air-gapped network 102 of FIG. 1. In some embodiments, at least a portion of the process of FIG. 5 is performed in 304 of FIG. 3.

At 502, computer program component(s) are executed on information technology resource end points to generate a plurality of configuration item data payloads. In some embodiments, the computer program component(s) are computer script(s). In some embodiments, the information technology resource end points are hardware devices (e.g., computers) of air-gapped network 102. For example, a CI data collection script may be executed on each computer within air-gapped network 102 to collect CI data attributes of devices and software installed on that computer. In various embodiments, each end point (e.g., each computer) for which CI data is collected results in a CI data payload in the form of a file comprising CI data. For example, the file may be a JSON file. Multiple end points (e.g., multiple computers) for which CI data is collected produce multiple files (e.g., multiple JSON files) with CI data.

At 504, the plurality of configuration item data payloads is consolidated into a single file. For example, multiple JSON files with CI data can be consolidated into a single JSON file by utilizing a computer script that reads each individual JSON file and copies CI data in each individual JSON file into a master JSON file. Consolidation makes review of CI data and exfiltration of CI data more straightforward and less error-prone because the likelihood of overlooking CI data is reduced (as all CI data is located in one file).

At 506, the single file is reviewed using an electronic review interface component and an extraction payload is created. In some embodiments, the electronic review interface component is data review interface 106 of FIG. 1. In various embodiments, a security officer utilizes the electronic review interface component to censor CI data items in the single file. For example, the security officer may scroll through and search for CI data items to review and then individually remove or obfuscate CI data items or apply censorship rules to the CI data items. Automated censorship rules may first be applied before manual review by the security officer. The security officer may then manually verify the automated censorship decisions. In some embodiments, the created extraction payload is the single file with specified CI data item entries removed or obfuscated. For example, the extraction payload may be a JSON file that is a modified version of a JSON file inputted to the electronic review interface component.

At 508, it is determined whether edits were made during the review. Edits include manual censorship decisions (e.g., to remove or obfuscate CI data items) made by a security officer. If it is determined at 508 that edits were not made, then 510 is skipped. If it is determined at 508 that edits were made, at 510, settings of the electronic review interface component are updated. Automated censorship rules of the electronic review interface component may be updated to reflect the edits that were made. For example, if all CI data items associated with a specific computer are removed, then a new censorship rule may be created, wherein the new censorship rule indicates CI data collection from the specific computer is to be avoided during future CI data collection.

At 512, the extraction payload is physically exfiltrated via a portable physical storage medium. In various embodiments, the extraction payload is electronically copied onto the portable physical storage medium and carried out of the air-gapped network. For example, after reviewing and censoring the single file with consolidated CI data, a security officer may copy the reviewed and censored file to a USB drive (or any other portable physical storage medium) and carry the USB drive by hand out of air-gapped network to copy the CI data on the USB drive to a computer outside the air-gapped network.

To utilize the computer program component(s) to collect data from the air-gapped network in the process of FIG. 5, the computer program component(s), such as scripts, are first deployed into the air-gapped network. Several approaches for deploying scripts are possible, e.g., logon scripts, leveraging existing deployment technology utilized by the air-gapped network, or manual deployment by an administrator. For example, with manual deployment, scripts can be stored on a portable physical storage medium and physically carried into the air-gapped network for deployment/installation in a manner similar to how censored CI data is stored on a portable physical storage medium and physically carried out of the air-gapped network. In many scenarios, manual deployment is the most secure approach. Automated approaches are also possible. For example, automated deployment from a counterpart non-air-gapped instance (e.g., non-air-gapped instance 112 of FIG. 1) can be utilized according to specified criteria (e.g., according to user login events, such as specified users logging into specified resources of the air-gapped network triggering deployment, deployment according to a specified schedule, such as a schedule for periodically updating deployed scripts, etc.). With respect to filtering and censorship by the security officer, various approaches are also possible. In some embodiments, the security officer utilizes a web user interface that consumes collected CI data and displays a master JSON file (or CI data in another data format) for the security officer. The security officer is able to selectively view CI data in the master JSON file (or another file format) according to various criteria. For example, the security officer can select a list format in which CI data is organized according to hardware assets within the air-gapped network. CI data can be reviewed and censored to meet security requirements. The security officer can utilize the user interface to remove CI data from the master JSON file. Another review option in the user interface is CI data obfuscation, which involves rendering data unintelligible, e.g., by altering alphanumeric characters of words associated with CIs, such as CI names. Obfuscation alterations can be random and thus irreversible. They can also be non-random and irreversible (a specified word would be obfuscated in the same way every time but would not be able to be decoded) or non-random and reversible (decoding would be possible). In scenarios in which decoding is possible, obfuscation is functionally similar to encryption.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
  collecting configuration item data from information technology resources of an air-gapped network for an information technology configuration management database;
  filtering the collected configuration item data using a specified item data property including by automatically identifying a collected information of interest about a discovered information technology asset among the collected configuration item data and irreversibly modifying the collected information of interest about the discovered information technology asset included in the collected configuration item data;
  based on a type of content that has been modified in the collected information of interest, determining a new automatic rule indicating the type of content to be avoided during a future data collection; and
  storing at least a portion of the filtered collected configuration item data on a portable physical storage medium within the air-gapped network.

2. The method of claim 1, wherein the portable physical storage medium is for physical transfer outside the air-gapped network into the information technology configuration management database.

3. The method of claim 1, wherein the information technology resources include computers in the air-gapped network and computer software installed on the computers.

4. The method of claim 1, wherein the portable physical storage medium includes one of the following: a Universal Serial Bus drive, a flash drive, a Digital Video Disc, a compact disc, or an external hard drive.

5. The method of claim 1, wherein information technology management services are received for the air-gapped network using at least a portion of the filtered collected configuration item data on the portable physical storage medium transferred outside the air-gapped network.

6. The method of claim 5, wherein the information technology management services include software asset management services and the software asset management services include software license monitoring.

7. The method of claim 1, wherein collecting configuration item data includes executing a received computer program component on hardware devices in the air-gapped network.

8. The method of claim 7, wherein the received computer program component is configured to output the collected configuration item data to a software user interface that is configured to present the collected configuration item data for review.

9. The method of claim 8, wherein the software user interface is configured to store settings associated with censorship of subsequently collected configuration item data based at least in part on review inputs.

10. The method of claim 1, wherein the collected configuration item data is reviewed by a human.

11. The method of claim 1, wherein the air-gapped network includes security measures to prevent automated outflow of data via wired and wireless electronic communication channels.

12. The method of claim 1, wherein the filtered collected configuration item data on the portable physical storage medium is imported to a management, instrumentation, and discovery server of a non-air-gapped network.

13. The method of claim 12, wherein the imported data is sent to the information technology configuration management database via the Internet.

14. The method of claim 1, wherein irreversibly modifying the collected information of interest includes altering of alphanumeric characters associated with the collected configuration item data.

15. A system, comprising:
one or more processors configured to:
collect configuration item data from information technology resources of an air-gapped network for an information technology configuration management database;
filter the collected configuration item data using a specified item data property including by being figured to automatically identify a collected information of interest about a discovered information technology asset among the collected configuration item data and irreversibly modify the collected information of interest about the discovered information technology asset included in the collected configuration item data;
based on a type of content that has been modified in the collected information of interest, determine a new automatic rule indicating the type of content to be avoided during a future data collection; and
store at least a portion of the filtered collected configuration item data on a portable physical storage medium within the air-gapped network; and
a memory coupled to at least one of the one or more processors and configured to provide at least one of the one or more processors with instructions.

16. The system of claim 15, wherein the portable physical storage medium is for physical transfer outside the air-gapped network into the information technology configuration management database.

17. The system of claim 15, wherein the information technology resources include computers in the air-gapped network and computer software installed on the computers.

18. The system of claim 15, wherein the portable physical storage medium includes one of the following: a Universal Serial Bus drive, a flash drive, a Digital Video Disc, a compact disc, or an external hard drive.

19. The system of claim 15, wherein information technology management services are received for the air-gapped network using at least a portion of the filtered collected configuration item data on the portable physical storage medium transferred outside the air-gapped network.

20. A computer program product embodied in a non-transitory computer readable medium and comprising computer instructions for:
collecting configuration item data from information technology resources of an air-gapped network for an information technology configuration management database;
filtering the collected configuration item data using a specified item data property including by automatically identifying a collected information of interest about a discovered information technology asset among the collected configuration item data and irreversibly modifying the collected information of interest about the discovered information technology asset included in the collected configuration item data;
based on a type of content that has been modified in the collected information of interest, determining a new automatic rule indicating the type of content to be avoided during a future data collection; and
storing at least a portion of the filtered collected configuration item data on a portable physical storage medium within the air-gapped network.

\* \* \* \* \*